(12) United States Patent
Nhep et al.

(10) Patent No.: US 10,281,649 B2
(45) Date of Patent: May 7, 2019

(54) SPLICE-ON FIBER OPTIC CONNECTOR

(71) Applicant: COMMSCOPE TECHNOLOGIES LLC, Hickory, NC (US)

(72) Inventors: Ponharith Nhep, Savage, MN (US); Yu Lu, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/756,450

(22) PCT Filed: Aug. 30, 2016

(86) PCT No.: PCT/US2016/049475
§ 371 (c)(1),
(2) Date: Feb. 28, 2018

(87) PCT Pub. No.: WO2017/040517
PCT Pub. Date: Mar. 9, 2017

(65) Prior Publication Data
US 2018/0267243 A1    Sep. 20, 2018

Related U.S. Application Data

(60) Provisional application No. 62/212,426, filed on Aug. 31, 2015.

(51) Int. Cl.
*G02B 6/38* (2006.01)
*G02B 6/255* (2006.01)

(52) U.S. Cl.
CPC .......... *G02B 6/2551* (2013.01); *G02B 6/255* (2013.01); *G02B 6/2555* (2013.01); *G02B 6/38* (2013.01); *G02B 6/3846* (2013.01); *G02B 6/3849* (2013.01)

(58) Field of Classification Search
None
See application file for complete search history.

(56) References Cited

U.S. PATENT DOCUMENTS

| | | |
|---|---|---|
| 5,390,269 A | 2/1995 | Palecek et al. |
| 7,744,288 B2 | 6/2010 | Lu et al. |
| 9,016,953 B2 | 4/2015 | Ott et al. |
| 9,304,262 B2 | 4/2016 | Lu |
| 9,684,138 B2 | 6/2017 | Lu |
| 2012/0328247 A1 | 12/2012 | Kachmar |
| 2014/0064665 A1 | 3/2014 | Ott et al. |

FOREIGN PATENT DOCUMENTS

| | | |
|---|---|---|
| WO | 2014/042799 A1 | 3/2014 |
| WO | 2014/197272 A1 | 12/2014 |

OTHER PUBLICATIONS

International Search Report and Written Opinion of the International Searching Authority for corresponding International Patent Application No. PCT/US2016/049475 dated Nov. 10, 2016, 14 pages.

*Primary Examiner* — Jerry Rahll
(74) *Attorney, Agent, or Firm* — Merchant & Gould P.C.

(57) ABSTRACT

The present disclosure relates to a splice-on connector configuration having connector body defining a forward fiber buckling region and a rearward splice encapsulation region. The splice encapsulation region can be filled with curable adhesive. The splice encapsulation region can also function to anchor a fiber optic cable.

20 Claims, 11 Drawing Sheets

SPLICE-ON FIBER OPTIC CONNECTOR

CROSS-REFERENCE TO RELATED APPLICATION

This application is a U.S. National Stage Application of PCT/US2016/049475, filed on Aug. 30, 2016, which claims the benefit of U.S. Patent Application Ser. No. 62/212,426, filed on Aug. 31, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connector and cable assemblies.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

A typical fiber optic connector includes a ferrule assembly supported at a front end of a connector housing. The ferrule assembly includes a ferrule and a hub mounted to a rear end of the ferrule. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of their respective ferrules abut one another and the ferrules are forced together by the spring loads of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another.

A fiber optic connector is often secured to the end of a corresponding fiber optic cable by anchoring a tensile strength structure (e.g., strength members such as aramid yarns, fiberglass reinforced rods, etc.) of the cable to the connector housing of the connector. Anchoring is typically accomplished through the use of conventional techniques such as crimps or adhesive. Anchoring the tensile strength structure of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors. In other connector styles, the tensile strength layer of the fiber optic cable can be anchored to the hub of the ferrule assembly.

Connectors are often installed on fiber optic cables in the factory through a direct termination process. In a direct termination process, the connector is installed on the fiber optic cable by securing an end portion of an optical fiber of the fiber optic cable within a ferrule of the connector. After the end portion of the optical fiber has been secured within the ferrule, the end face of the ferrule and the end face of the optical fiber are polished and otherwise processed to provide an acceptable optical interface at the end of the optical fiber. Splice-on fiber optic connectors are also known. A splice-on fiber optic connector typically includes a ferrule assembly having a ferrule that supports a stub optical fiber. The stub optical fiber includes a rear stub portion that is spliced to a corresponding optical fiber of a fiber optic cable. Example splice-on fiber optic connectors are disclosed by U.S. Pat. No. 9,016,953.

SUMMARY

The present disclosure relates to fiber optic connectors having in-body splices such as fusion splices. Certain aspects of the present disclosure relate to splice-on fiber optic connectors having robust designs that are configured to enhance ease of assembly while also being cost competitive. Certain aspects of the present disclosure relate to splice-on connectors having forward portions having provisions for accommodating fiber buckling and rearward portions having provisions for protecting splice locations within a curable adhesive. In certain examples, cables can also be anchored by curable adhesive within the rearward portions.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
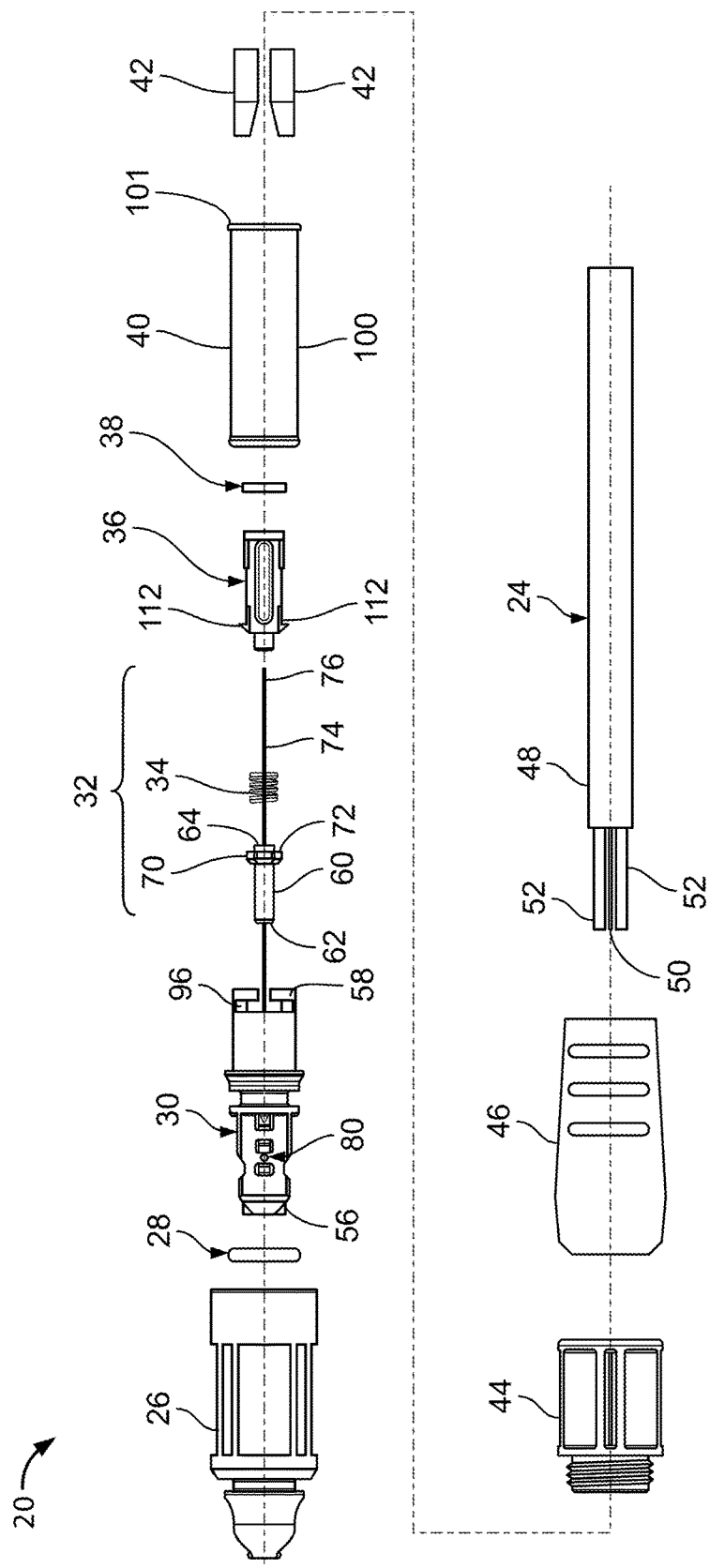
FIG. 1 is an exploded view of a fiber optic connector and cable assembly in accordance with the principles of the present disclosure.
Figure 2:
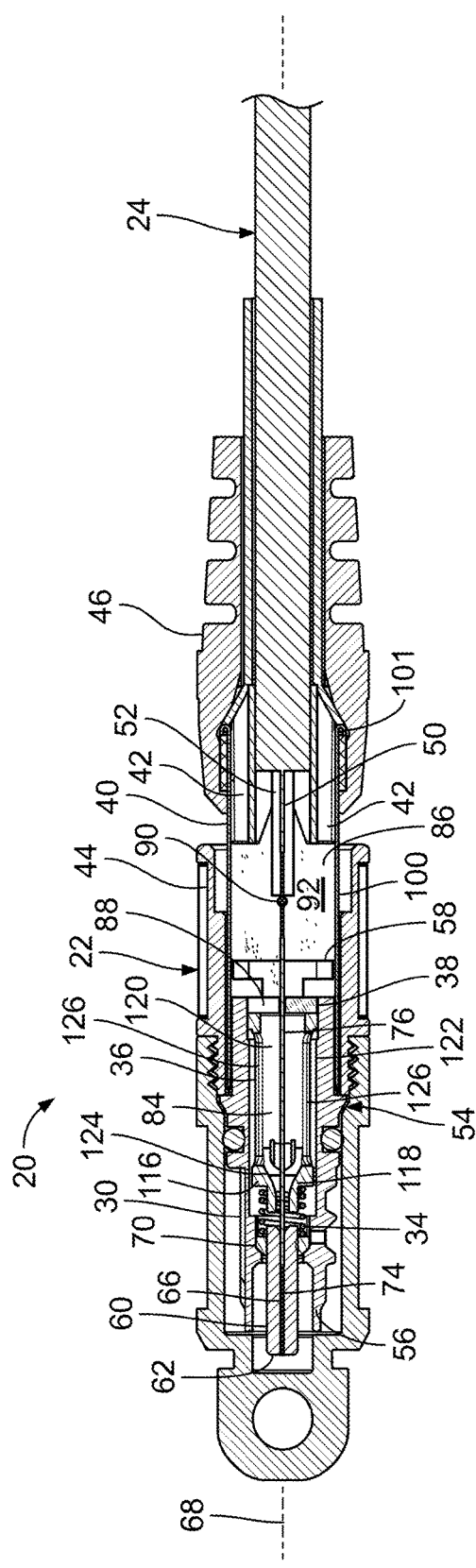
FIG. 2 is a cross-sectional view of the fiber optic connector and cable assembly of FIG. 1.
Figure 3:
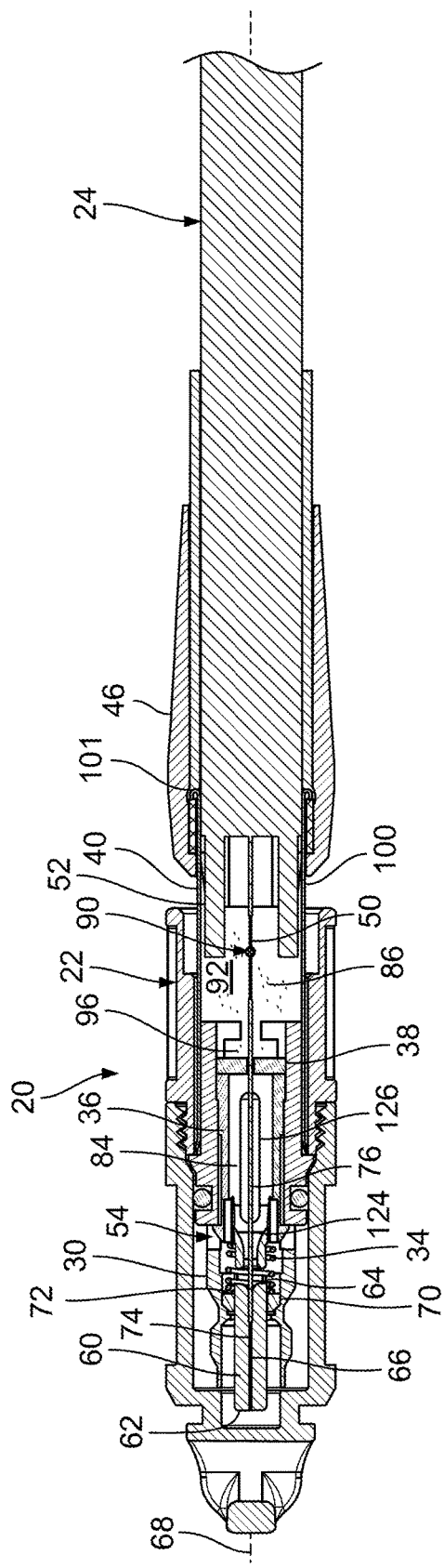
FIG. 3 is another cross-sectional view of the fiber optic connector and cable assembly of FIG. 1.

FIGS. 1-3 illustrate a fiber optic connector and cable assembly 20 in accordance with the principles of the present disclosure. The fiber optic connector and cable assembly 20 includes a splice-on fiber optic connector 22 that is optically coupled to a fiber optic cable 24. The fiber optic connector 22 includes a dust cap 26, an exterior seal 28 (e.g., an O-ring), a front housing 30, a ferrule assembly 32, a spring 34, a spring stop 36, an adhesive block 38 (i.e., an adhesive barrier or plug), a rear housing 40, cable supports 42, a rotatable fastener 44 (i.e., a rotatable coupler), and a flexible boot 46. The fiber optic cable 24 includes a jacket 48 containing a cable optical fiber 50 and strength members 52.

Referring to FIG. 2, the front housing 30 and the rear housing 40 interconnect to form a connector body 54 of the fiber optic connector 22. The front housing 30 includes a front end 56 and a rear end 58. The front end 56 of the front housing 30 forms a plug portion of the connector body 54. The plug portion can be keyed and can be configured to be received within the port of a corresponding fiber optic adapter at a pre-determined rotational orientation. A fiber optic adapter suitable for mating with the fiber optic connector 22 is disclosed by U.S. Pat. No. 7,744,288, which is hereby incorporated by reference in its entirety. The rear housing 40 is mounted over the rear end 58 of the front housing 30 and extends rearwardly from the rear end 58 of the front housing 30.

The ferrule assembly 32 of the fiber optic connector 22 mounts within the connector body 54. The ferrule assembly 32 includes a ferrule 60 having a front end 62 and a rear end 64. The front end 62 of the ferrule 60 is often polished and is accessible at the front end 56 of the front housing 30. The ferrule 60 defines a central bore 66 that extends through the ferrule 60 along a central longitudinal axis 68 of the ferrule 60. The central bore 66 extends along the central longitudinal axis 68 from the front end 62 to the rear end 64 of the ferrule 60. The ferrule assembly 32 also includes a ferrule flange 70 mounted on the ferrule 60. The ferrule flange 70 defines a rearwardly facing surface 72. In certain examples, the ferrule flange 70 has a non-circular outer shape configured for allowing the ferrule flange 70 to mate with a corresponding receptacle in the front housing 30 in a manner that prevents the ferrule assembly 32 from rotating about the central longitudinal axis 68 relative to the front housing 30. In certain examples, the ferrule flange 70 can include one or more flats. In one example, the ferrule flange 70 has a hexagonal shape that mates with a corresponding hexagonal receptacle defined within the front housing 30. The ferrule assembly 32 further includes a ferrule optical fiber 74 secured within the central bore 66 of the ferrule 60. The ferrule optical fiber 74 includes a rear stub portion 76 that projects rearwardly from the rear end 64 of the ferrule 60. In certain examples, the ferrule optical fiber 74 is secured within the central bore 66 of the ferrule 60 by a curable adhesive such as epoxy. The rear stub portion 76 can also be referred to as a "pigtail" or as a "free end portion."

The ferrule 60 is preferably constructed of a relatively hard material capable of protecting and supporting the ferrule optical fiber 74. In one example, the ferrule 60 has a ceramic construction. In other examples, the ferrule 60 can be made of alternative materials such as Ultem, thermal plastic materials such as polyphenylene sulfide (PPS), other engineered plastics or various metals. In one example, the ferrule 60 has a length in the range of 5-15 millimeters (mm).

In certain examples, the ferrule assembly 32 is tuned relative to the connector body 54 such that a core offset of the ferrule optical fiber 74 relative to the ferrule 60 is rotationally aligned at a predetermined rotational orientation relative to the front housing 30. In certain examples, the ferrule flange 70 has a plurality of flats and the flat most closely aligned with a core offset of the ferrule optical fiber 74 is marked with a core offset marking. In certain examples, the front housing 30 defines a viewing opening 80 (see FIG. 1). When the ferrule assembly 32 is loaded into the front housing 30, the ferrule assembly 32 is rotationally oriented such that the core offset marking aligns with the viewing opening 80. In this way, after assembly, it is possible to verify that the fiber optic connector 22 is properly tuned by viewing the core offset marking through the viewing opening 80. By aligning the core offset marking with the viewing opening 80, the ferrule assembly 32 is rotationally aligned at a desired tuned rotational orientation relative to a key or other structure provided on the front housing 30. It will be appreciated that a mating relationship between the ferrule flange 70 and the interior of the front housing 30 prevents the ferrule assembly 32 from rotating out of the tuned orientation. Further details regarding tuning can be found at U.S. Pat. No. 9,016,953 which is hereby incorporated by reference in its entirety.

When the ferrule assembly 32 is mounted within the connector body 54, the ferrule assembly 32 is axially movable within the connector body 54 along the central longitudinal axis 68 between a forward ferrule position (shown at FIGS. 2 and 3) and a rearward ferrule position. The spring 34 functions to bias the ferrule assembly 32 toward the forward ferrule position. The spring 34 applies a forward biasing force to the rearwardly facing surface 72 of the ferrule flange 70. In the depicted example, a front end of the spring 34 seats upon the rearwardly facing surface 72. It will be appreciated that the ferrule flange 70 is rotationally and axially fixed relative to the ferrule 60. Additionally, the ferrule flange 70 is forwardly offset from the rear end 64 of the ferrule 60. In the depicted example, the ferrule flange 70 is closer to the rear end 64 of the ferrule 60 as compared to the front end 62 of the ferrule 60.

The adhesive block 38 of the fiber optic connector 22 is mounted within the connector body 54 at a position which divides an interior 82 of the connector body 54 into a forward portion 84 and a rearward portion 86. The adhesive block 38 defines a slot 88 through which the rear stub portion 76 of the ferrule optical fiber 74 extends. In certain examples, the adhesive plug 38 can have a resilient elastomeric construction such as rubber that allows the slot 88 to flex open so as to receive the rear stub portion 76 of the ferrule optical fiber 74 and then self-close to prevent adhesive from passing though the slot 88.

The cable optical fiber 50 is depicted as being optically spliced (e.g., fusion spliced) to the rear stub portion 76 of the ferrule optical fiber 74 at a splice location 90 within the rearward portion 86 of the interior 82 of the connector body 54. A curable adhesive 92 fills the rearward portion 86 of the interior of the connector body 54. The curable adhesive 92 encapsulates the splice location 90 and anchors the fiber optic cable 24 within the rearward portion 86 of the interior of the connector body 54. In certain examples, the curable adhesive 92 can include a thermo-set adhesive, a thermoplastic adhesive, a radiation curable adhesive, or other type of curable adhesive. In certain examples, curable adhesive includes an epoxy.

The adhesive block 38 is configured to prevent the curable adhesive 92 from entering the forward portion 84 of the interior of the connector body 54. The forward portion 84 of the interior of the connector body 54 forms a fiber buckling region for accommodating buckling of the rear stub portion 76 of the ferrule optical fiber 74 as the ferrule 60 moves from the forward ferrule position toward the rearward ferrule position. It will be appreciated that the ferrule 60 is forced to move from the forward ferrule position toward the rearward ferrule position when the fiber optic connector 22 is connected to another fiber optic connector through an intermediate fiber optic adapter.

In certain examples, the fiber buckling region 94 accommodates fiber buckling corresponding to at least 0.04 inches of movement of the ferrule assembly 32 from the forward ferrule position to the rearward ferrule position. In certain examples, the fiber buckling region is configured to force the rear stub portion 76 of the ferrule optical fiber to buckle along a single pre-defined fiber buckling plane that aligns with the central longitudinal axis 68 of the ferrule 60. In certain examples, buckling occurs along a single macrobend that extends along the fiber buckling region.

In certain examples, the curable adhesive chamber defined by the rearward portion 86 of the connector body 54 serves both a splice protection function and a cable anchoring function. In certain examples, the splice location 90 is imbedded within the curable adhesive 92 within the rear portion 86 of the connector body 54. In certain examples, the strength members 52 of the fiber optic cable 24 can be anchored within the curable adhesive that fills the rearward portion 86 of the connector body 54. In certain examples, the jacket 48 of the fiber optic cable 24 can be bonded to the curable adhesive within the rearward portion 86 of the connector body 54. In certain examples, the strength members 52 of the fiber optic cable 24 can be relatively stiff so as to have both tensile and compressive reinforcing characteristics. An example of this type of strength member includes a fiber reinforced epoxy rod. In other examples, the strength members 52 can be configured to provide mostly tensile reinforcement. An example of this type of strength member includes Aramid yarn or other type of fibrous strength member. In certain examples, the fiber optic cable 24 can be a flat-drop cable where the jacket 48 has an elongate transverse cross-sectional shape.

In certain examples, the curable adhesive 92 within the rearward portion 86 of the connector body 54 also functions to bond the front and rear housings 30, 40 together. As depicted at FIG. 1, the rear end of the front housing 30 can include notches, slots or other structures into which the curable adhesive can flow to enhance coupling between the front and rear housings 30, 40. Examples of such structure can include through-slots 96 defined laterally through a side wall of the front housing 30.

In certain examples, the rear housing 40 can include a sleeve such as a cylindrical sleeve 100. In certain examples, the sleeve 100 can be made of a material that includes metal. One example metal includes stainless steel. In certain examples, the sleeve 100 is configured to slide over a rear portion of the front housing 30 and is bonded in place at the rear end of the front housing 30 by the curable adhesive 92. A rear end of the sleeve 100 can include a circumferential lip 102 over which the flexible boot 46 can snap such that the lip 102 assists in retaining the flexible boot 46 on a rear end 101 of the sleeve 100.

Figure 5:
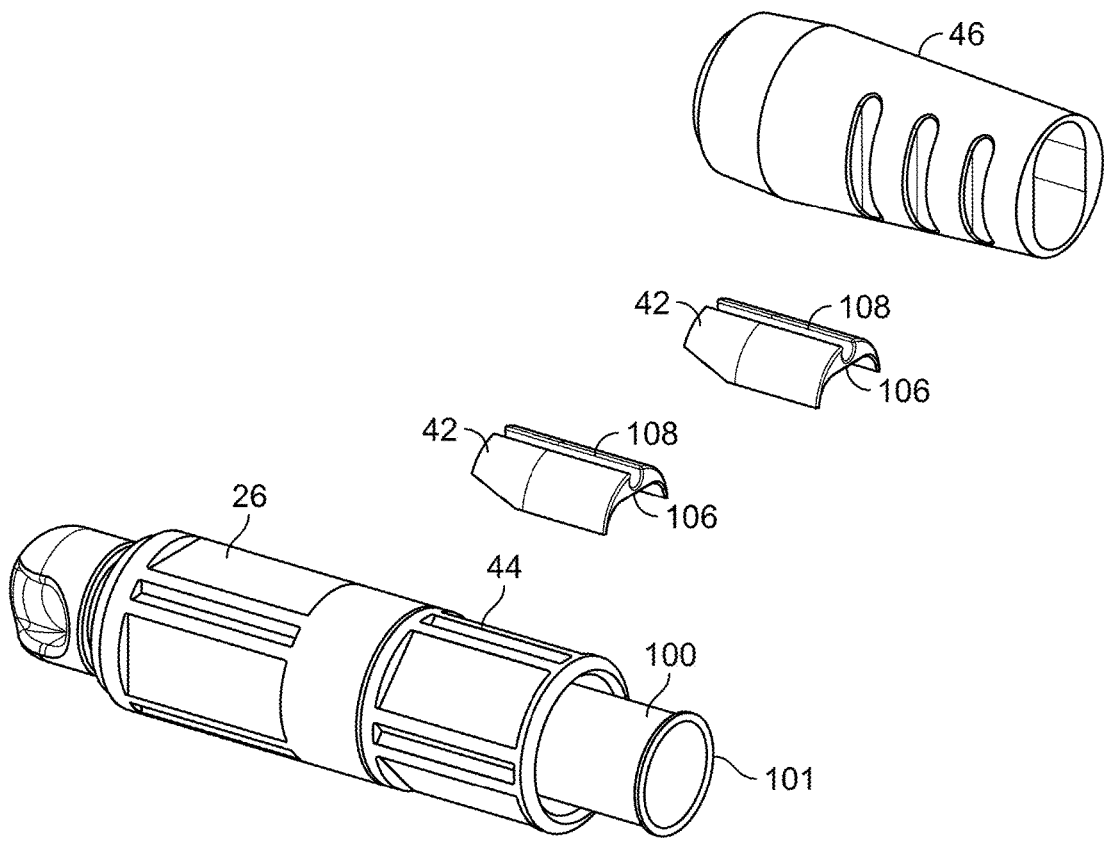
FIG. 5 is a partially assembled view of the fiber optic connector and cable assembly of FIG. 1.

The interior of the sleeve 100 can form the rearward portion 86 of the interior of the connector body 54. Thus, the interior of the sleeve 100 can form the curable adhesive chamber in which the splice location 90 is embedded and in which the fiber optic cable 24 is anchored. The rear end 101 of the sleeve 100 is enclosed by two cable supports 42 (see FIGS. 5 and 6) that mount within the rear end 101 of the sleeve 100 and can be adhesively bonded to the sleeve 100. The cable supports 104 cooperate to define a central cable passage 106 having a transverse cross-sectional shape that matches a transverse cross-sectional profile of the jacket 48 of the fiber optic cable 24. As depicted, the transverse cross-sectional shape of the cable passage 106 is elongated so as to accommodate a flat-style drop cable. The cable supports 104 each define an outer longitudinal adhesive injection port 108 in fluid communication with the rearward portion 86 of the interior of the connector body 54. During assembly the various components are assembled together with the splice location 90 and the end of the cable 24 within the interior of the sleeve 100 and the cable supports 104 supporting the cable 24 at the rear end 101 of the sleeve 100. In this assembled configuration, curable adhesive can be injected into the interior of the sleeve 100 through one of the adhesive injection ports 108. Injection continues until the interior of the sleeve 100 is filled with adhesive and adhesive begins to exit the interior of the sleeve 100 through the other adhesive injection port 108. During the adhesive injection process, the adhesive block 38 prevents the adhesive from flowing from the rearward portion 86 of the connector body 54 into the forward portion 84 of the connector body 54.

Referring to FIG. 1, the rotatable fastener 44 is depicted as a threaded coupling nut but could also be a bayonet-style fastener or other type of rotatable fastener. In certain examples, the rotatable fastener 44 is mounted over the sleeve 100 and is free to rotate about the central longitudinal axis 68 relative to the sleeve 100. As depicted at FIG. 2, the rotatable fastener 44 is captured between the boot 46 and a circumferential shoulder 110 of the front housing 30. When the fiber optic connector is not in use, the rotatable fastener 44 can be coupled to the dust cap 26 to secure the dust cap 26 over the front housing 30 thereby protecting the ferrule 60 and its corresponding ferrule optical fiber 74. When it is desired to make an optical connection using the fiber optic connector 22, the dust cap 26 can be removed and the rotatable fastener 44 can be used to secure the fiber optic connector 22 within the port of a corresponding fiber optic adapter. The exterior seal 28 is mounted within a circumferential groove defined by the front housing 30. When the dust cap 26 is mounted over the front housing 30, the exterior seal 28 forms a circumferential seal between the dust cap 26 and the front housing 30. Similarly, when the fiber optic connector 22 inserted within the port of a corresponding fiber optic adapter, the exterior seal 28 forms a seal between the fiber optic connector 22 and the fiber optic adapter.

The flexible boot 46 of the fiber optic connector 22 is more flexible than the sleeve 100 and is adapted to provide fiber bend radius protection at the interface between the fiber optic connector 22 and the fiber optic cable 24. The flexible boot 46 is secured to the rear end 101 of the sleeve 100 at a location rearward of the rotatable fastener 44. The flexible boot 46 has a tapered outer profile that tapers inwardly as the flexible boot 46 extends in a rearward direction. In certain examples, the flexible boot 46 can have a segmented configuration to enhance flexibility.

Figure 4:
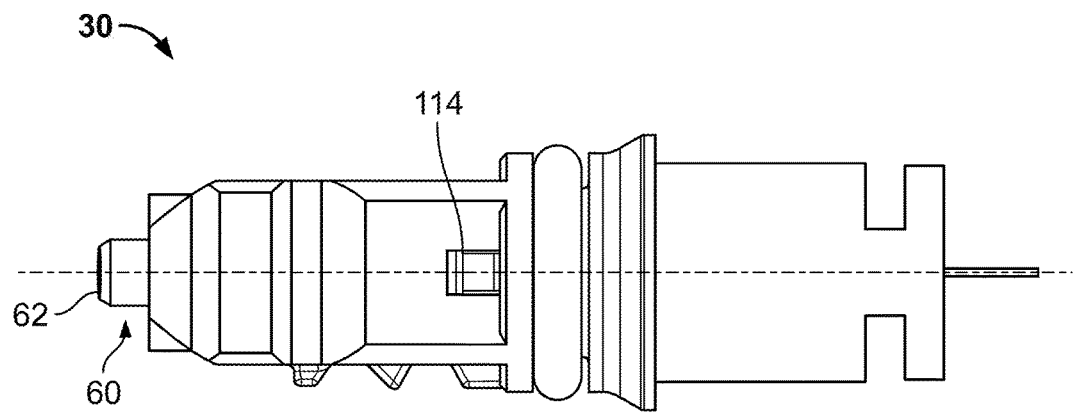
FIG. 4 is a side view of a front housing of the fiber optic connector and cable assembly of FIG. 1.
Figure 8:
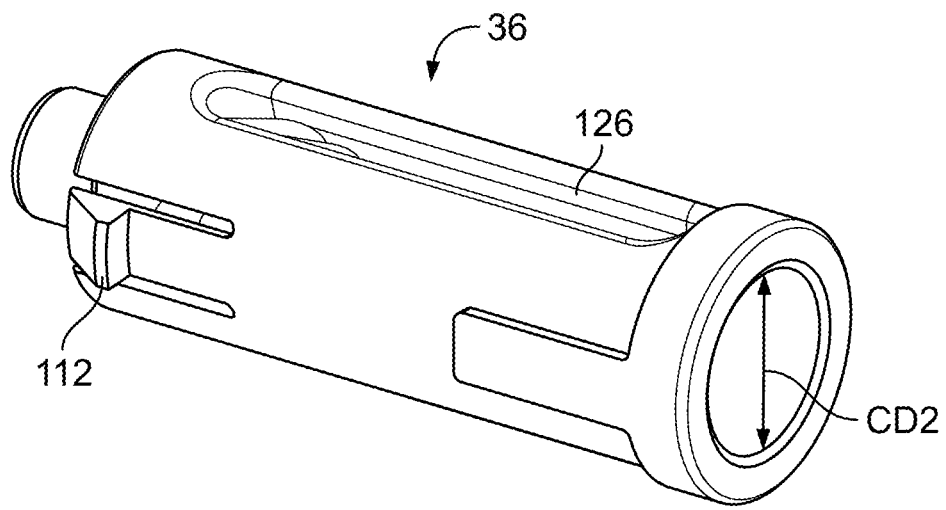
FIG. 8 is a perspective view of a spring stop of the fiber optic connector and cable assembly of FIG. 1.
Figure 9:
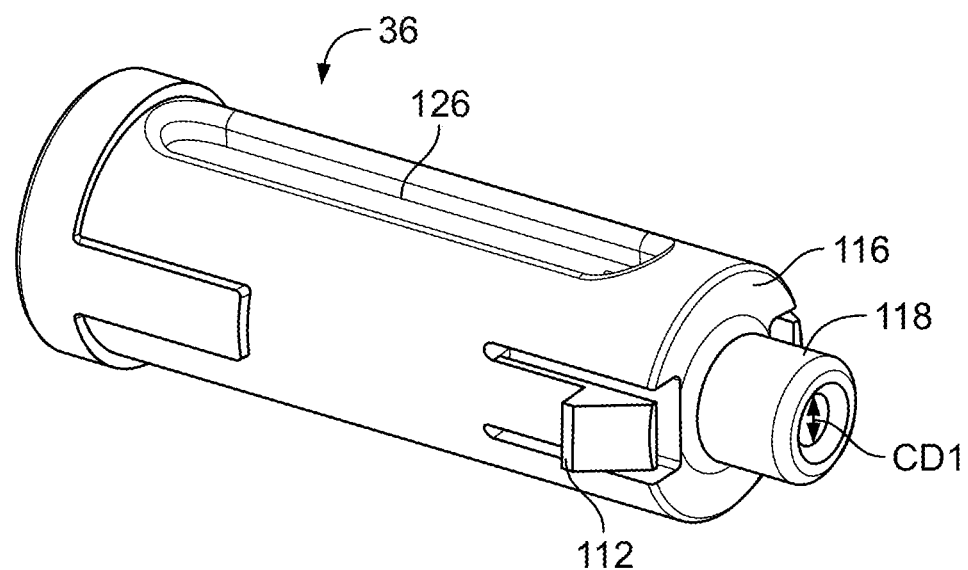
FIG. 9 is another perspective view of a spring stop of the fiber optic connector and cable assembly of FIG. 1.

Referring again to FIGS. 1-3, the spring stop 36 (shown at FIGS. 8 and 9) of the fiber optic connector 22 mounts within the interior of the connector body 54. In certain examples, the spring stop 36 is axially and rotationally fixed within the interior of the connector body 54. In one example, the spring stop 36 includes tabs 112 that snap within corresponding side openings 114 (see FIG. 4) defined by the front housing 30 so as to axially and rotationally lock the spring stop 36 in position relative to the front housing 30. The spring stop 36 includes a forwardly facing surface 116 against which a rear end of the spring 34 seats. The spring stop 36 also includes a central front nose section 118 that fits inside the rear end of the spring 34. The central front nose section 118 forms a positive stop that engages the rear end 64 of the ferrule 60 to stop rearward movement of the ferrule 60 at the rearward ferrule position. The positive stop has a fixed axial position relative to the front housing 38 and prevents the ferrule assembly from moving rearwardly to a point where the ferrule flange 70 disengages from its corresponding mating receptacle defined by the front housing 30. The positive stop also limits the range of movement of the ferrule 60 so that the maximum amount of fiber buckling that occurs in the fiber buckling region of the fiber optic connector 22 is controlled (i.e., the amount of fiber buckling is directly related to the permitted range of axial movement of the ferrule assembly 32.)

Referring to FIG. 2, the spring stop 36 defines a central passage 120 through which the rear stub portion 76 of the ferrule optical fiber 74 extends. The central passage 120 defines a first cross-dimension CD1 at the central front nose section 118 and a second cross-dimension CD2 at a main section 122 of the spring stop 36. The main section 122 is positioned rearwardly with respect to the central front nose section 118. The second cross-dimension CD2 is larger than the first cross-dimension. The spring stop 36 further includes a transition section 124 that provides a tapered internal transition between the first cross-dimension CD1 at the central front nose section 118 and the second cross-dimension CD2 at the main section 122. It will be appreciated that the fiber buckling region corresponding to the forward portion 84 of the connector body 54 is located within the spring stop 36. The adhesive block 38 is mounted at the rear end 58 of the front housing 30 and the spring stop 36 includes a rear end positioned adjacent the adhesive block 38. In certain examples, the rear stub portion 76 can buckle along a buckling plane can extend through elongated side through-slots 126 that are elongated along the central longitudinal axis 68 and that are positioned on opposite sides of the central longitudinal axis 68. The elongated side through-slots 126 are positioned at the major section 122 of the spring stop 36 and are configured to allow the rear stub portion 76 of the ferrule optical fiber 74 to flex through one of the elongated side through-slots 126 during buckling of the rear stub portion 76 of the ferrule optical fiber 74. Thus, a larger degree of buckling is accommodated.

Figure 6:
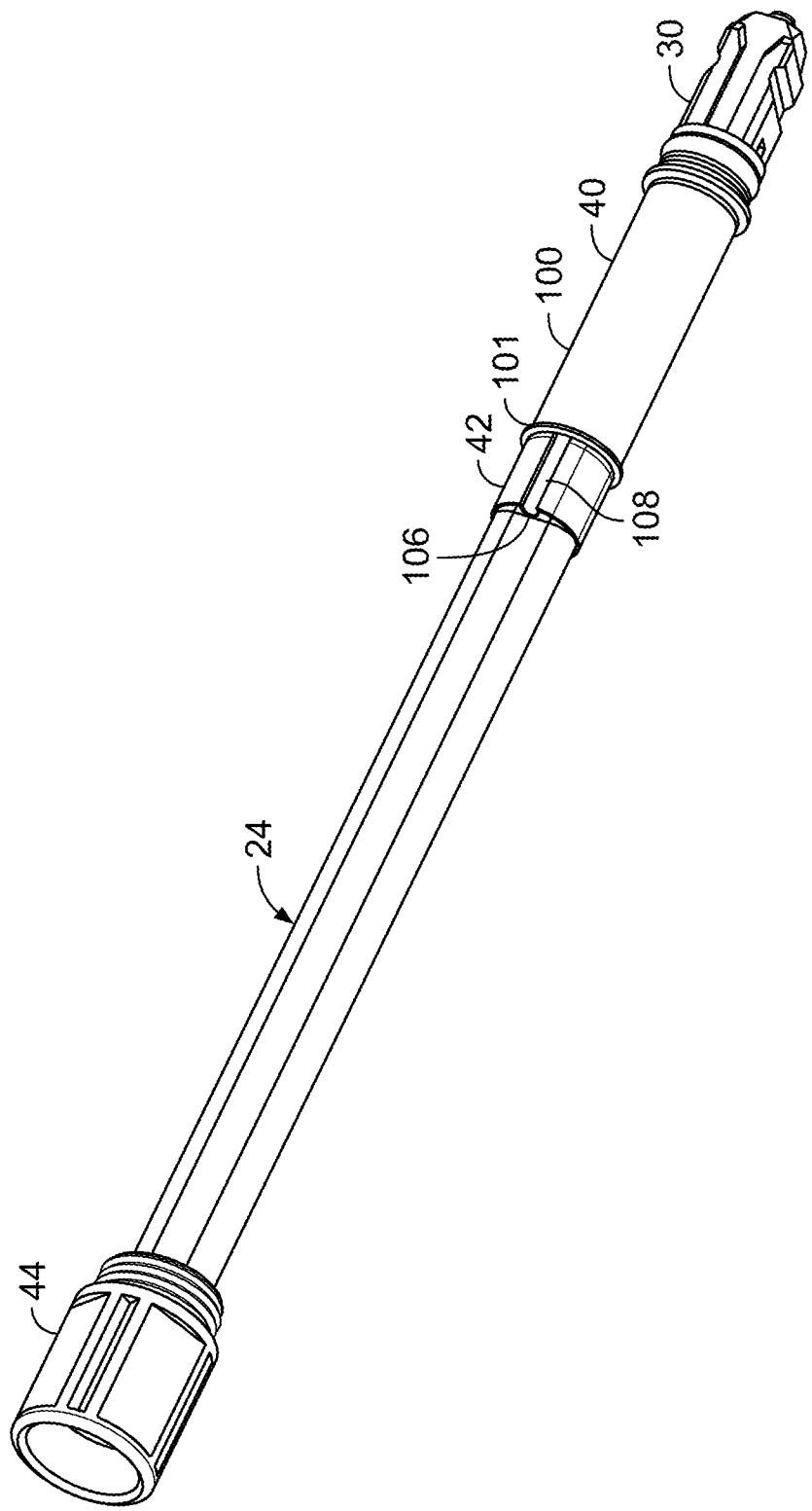
FIG. 6 is another partially assembled view of the fiber optic connector and cable assembly of FIG. 1.
Figure 7:
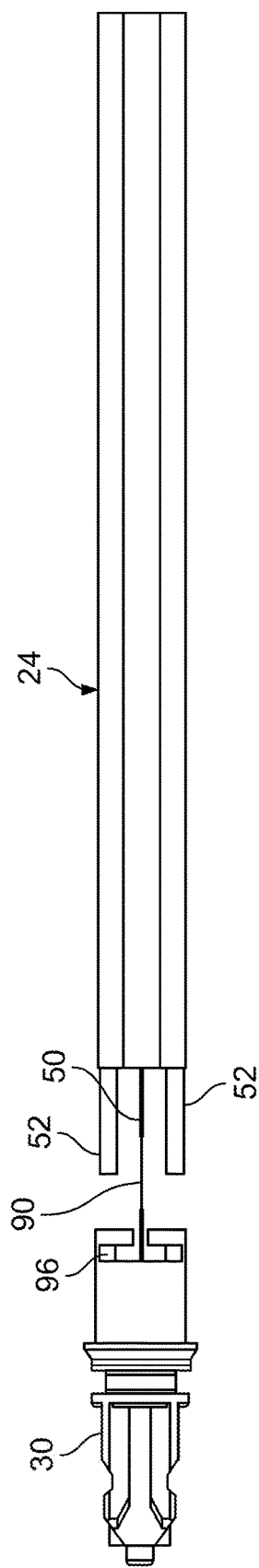
FIG. 7 is a diagram showing a splice location for the fiber optic connector and cable assembly of FIG. 1.

To assemble the fiber optic connector and cable assembly 20, the ferrule assembly 32 can be loaded into the front housing 30 through the rear end 58 of the front housing 30. Preferably, the ferrule assembly 32 is loaded at a tuned orientation in which the tuning marking on the ferrule flange 70 aligns with the viewing opening 80 of the front housing 30. Once the ferrule assembly 32 has been loaded into the front housing 30, the spring 34 is inserted over the rear stub portion 76 of the ferrule optical fiber 74 and loaded into the front housing 30 through the rear end 58 of the front housing 30. Next, the spring stop 36 is inserted over the rear stub portion 76 of the ferrule optical fiber 74 and loaded into the front housing 30 through the rear end 58 of the front housing 30. Preferably, the spring stop 36 is snapped in position relative to the front housing 30 such that the spring 34 is captured between the ferrule flange 70 and the forwardly facing surface 116 of the spring stop 36. As part of the initial assembly process, the rotatable fastener 44 and the rear sleeve 100 can be inserted over the fiber optic cable 24 as shown at FIG. 7. Thereafter, the jacket 48 can be stripped away from the end of the fiber optic cable 24 to expose the strength members 52 and the cable optical fiber 50. The cable optical fiber 50 as well as the rear stub portion 76 of the ferrule optical fiber 74 can then be stripped, cleaved and cleaned. Next, the rear stub portion 76 of the ferrule optical fiber 74 can be spliced to the cable optical fiber 50 at the splice location 90. Thereafter, the rear sleeve 100 is slid over the rear end 58 of the front housing 30 and the cable supports 104 are loaded into the rear end 101 of the sleeve 100 with the cable 24 supported within the central cable passage 106 defined by the cable supports 104. FIG. 6 shows the cable supports 104 supporting the cable 24 at the rear end of the sleeve 100. Next, curable adhesive is injected through one of the adhesive injection ports 108 to fill the interior of the sleeve 100 with curable adhesive thereby encapsulating the splice location 90 as well as the strength members 52 of the cable 24 and the end portion of the jacket 48 of the cable 24. Once the curable adhesive has been cured, the rotatable fastener 44 is slid over the sleeve 100 and the boot 46 is snapped over the rear end of the sleeve 100 to complete the assembly process.

FIGS. 10-16 show another fiber optic connector and cable assembly 220 in accordance with the principles of the present disclosure. The fiber optic connector and cable assembly includes a splice-on fiber optic connector 222 optically coupled to a fiber optic cable 224. The splice-on fiber optic connector 222 is depicted as an SC-style fiber optic connector. Also, the fiber optic cable 224 is depicted as a round cable. The fiber optic connector 222 includes a connector body 254 formed by a front housing 230 coupled to a rear housing 240. The ferrule assembly 32 and the spring 34 mount within the front housing 230. The rear housing 240 functions as a spring-stop for retaining the ferrule assembly 32 and the spring 34 within the front housing 230. The fiber optic connector 222 further includes an adhesive block 238 and an adhesive cap 241 that mount within the rear housing 240. The fiber optic connector 222 further includes a flexible boot 246 that mounts on a rear end of the rear housing 240 and a release sleeve 223 that mounts over the front housing 230. The fiber optic cable 224 has a jacket 248 having a round transverse cross-sectional shape. The fiber optic cable 224 further includes a cable optical fiber 250 and can include strength members 252 such as Aramid yarn or other fibrous strength members.

The connector body 254 of the fiber optic connector 222 includes the front housing 230 coupled to the rear housing 240. The front housing 230 includes a front end 256 and a rear end 258. The front end 256 forms a plug portion of the connector body 254 having an SC style form factor. The front housing 230 can include shoulders 259 that are engaged by corresponding latches when the fiber optic connector 222 is inserted within a corresponding fiber optic adapter. The release sleeve 223 is axially movable relative to the front housing 230 and is adapted for disengaging the latches of the fiber optic adapter from the shoulders 259 when it is desired to remove the fiber optic connector 222 from the fiber optic adapter. For example, the release sleeve 223 can include ramps 225 that force the latches away from the shoulders 259 when the release sleeve 223 is retracted so as to allow the fiber optic connector 222 to be removed from the fiber optic adapter.

The ferrule assembly 32 mounts within the front housing 230 such that the front end 62 of the ferrule 60 is accessible at the front end 256 of the front housing 230. Similar to the previously described example, the ferrule assembly 32 is movable within the connector body 254 along the central axis 68 between a forward ferrule position and a rearward ferrule position. The spring 34 biases the ferrule assembly 32 toward the forward ferrule position.

The adhesive block 238 of the fiber optic connector 222 divides the interior of the connector body into a forward portion 284 and a rearward portion 286. In the depicted example, the forward and rearward portions 284, 286 are defined within the rear housing 240. The adhesive block 238 defines a slot 288 through which the rear stub portion 76 of the ferrule optical fiber 74 extends. The adhesive block 238 can have a resilient construction that allows the slot 288 to be flexed open to accommodate receipt of the rear stub portion 76 of the ferrule optical fiber 74. The cable optical fiber 250 is spliced (e.g., fusion spliced) to the rear stub portion 76 of the ferrule optical fiber 74 at a splice location 290 within the rearward portion 286 of the interior of the connector body 254. A curable adhesive is used to fill the rearward portion 286 of the interior of the connector body 254. The curable adhesive encapsulates the splice location 290 and anchors the cable 224 within the rearward portion 286 of the interior region of the connector body 254. The adhesive block 238 is configured to prevent the curable adhesive from flowing into the forward portion 284 of the interior of the connector body 254. The forward portion 284 of the interior of the connector body 254 forms a buckling region for accommodating buckling of the rear stub portion 76 of the ferrule optical fiber 74 as the ferrule 60 moves from the forward ferrule position toward the rearward ferrule position.

Figure 10:
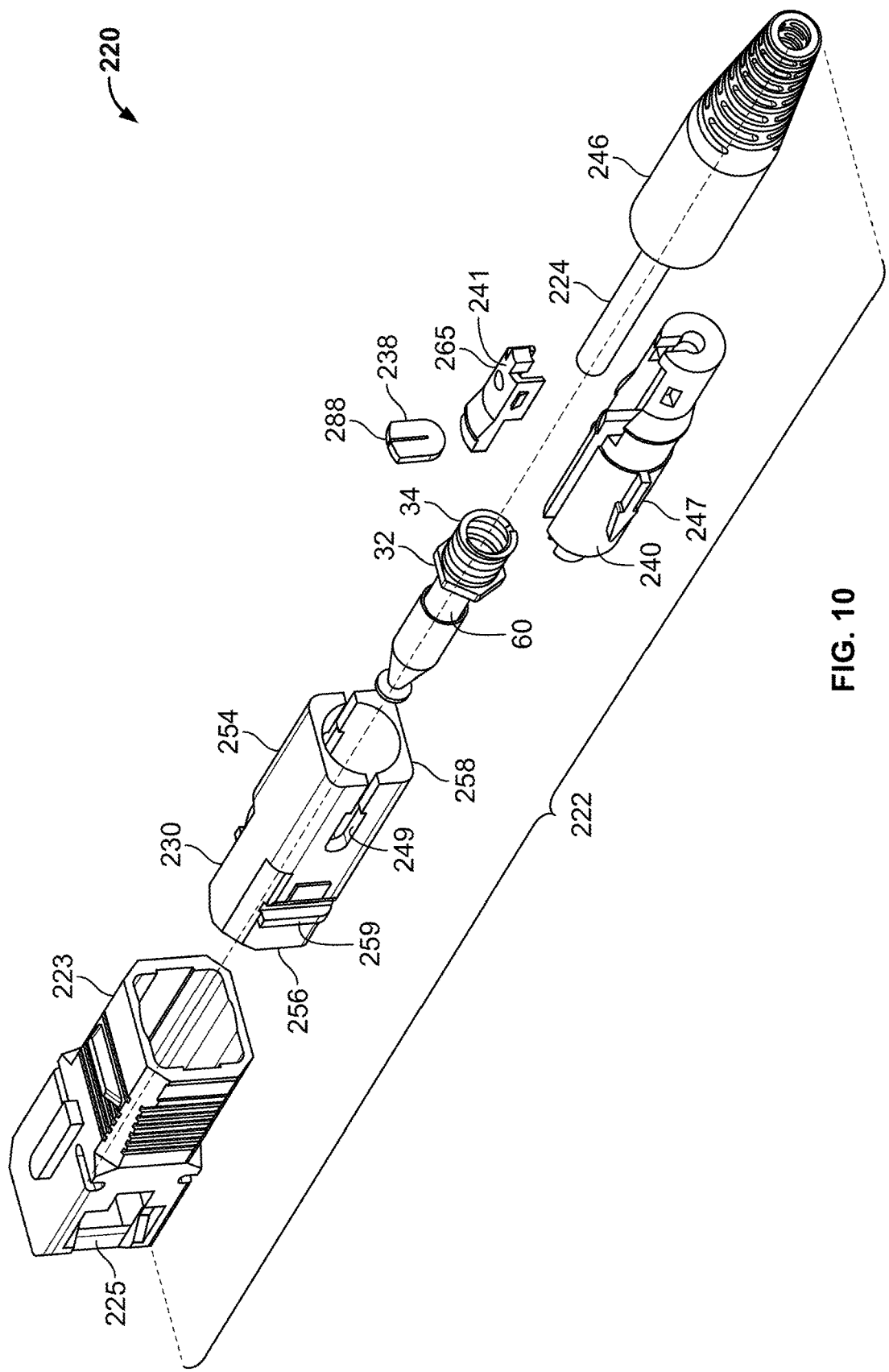
FIG. 10 is an exploded view of another fiber optic connector and cable assembly in accordance with the principles of the present disclosure.
Figure 11:
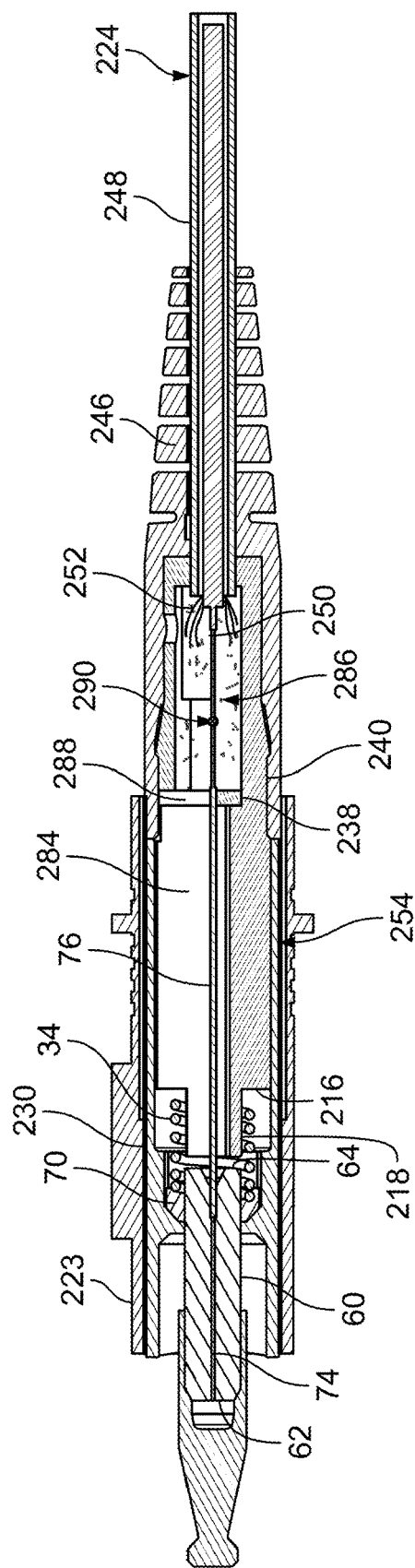
FIG. 11 is a cross-sectional view of the fiber optic connector and cable assembly of FIG. 10.
Figure 13:
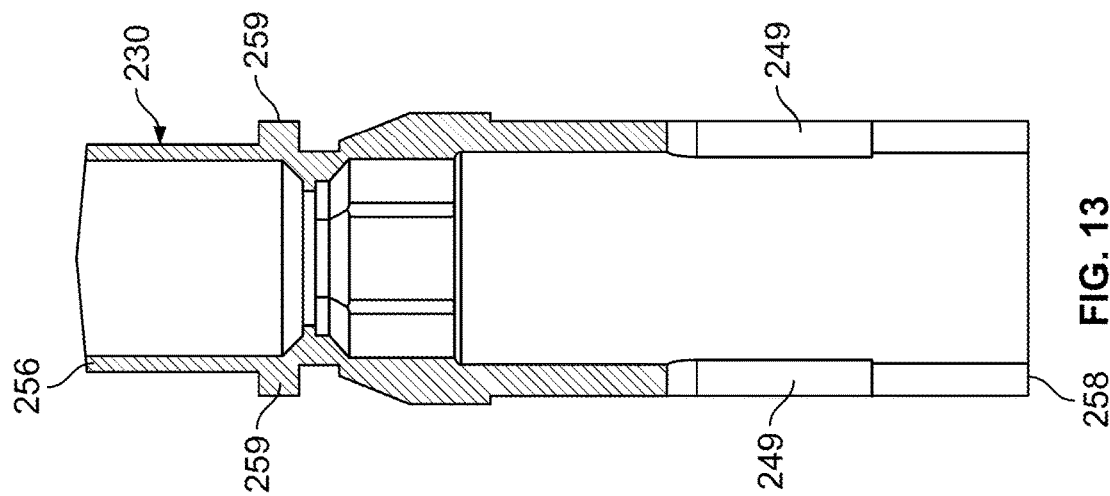
FIG. 13 is a cross-sectional view of the front housing of FIG. 12.
Figure 12:
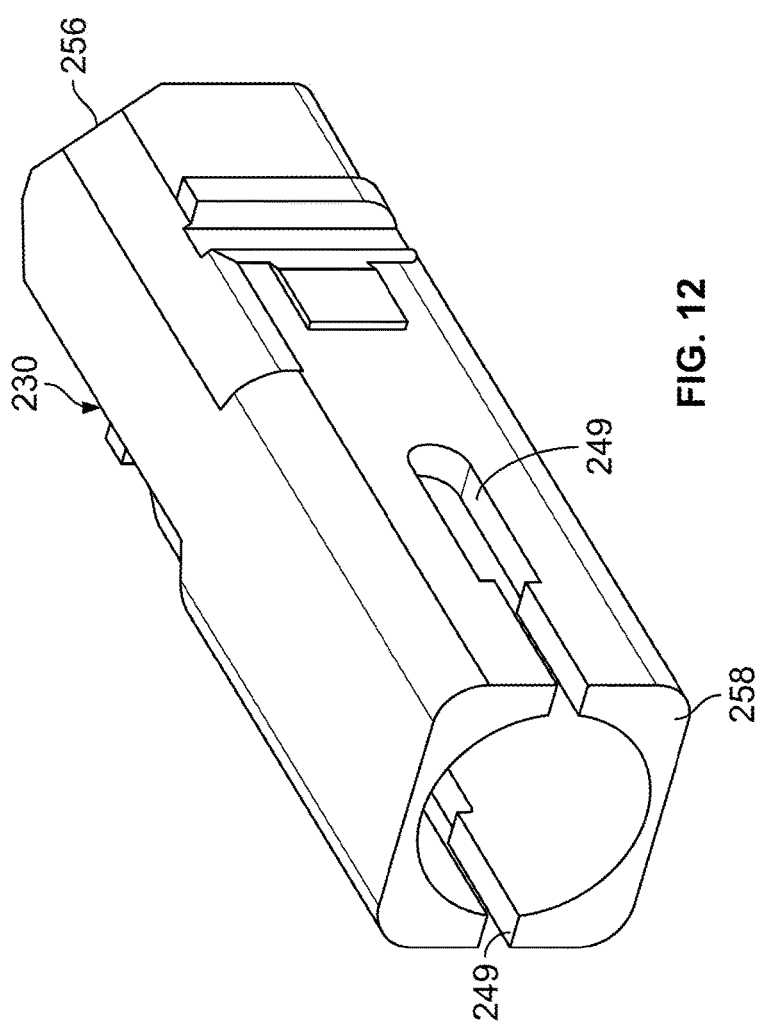
FIG. 12 is rear, side perspective view of a front housing of the fiber optic connector and cable assembly of FIG. 10.
Figure 14:
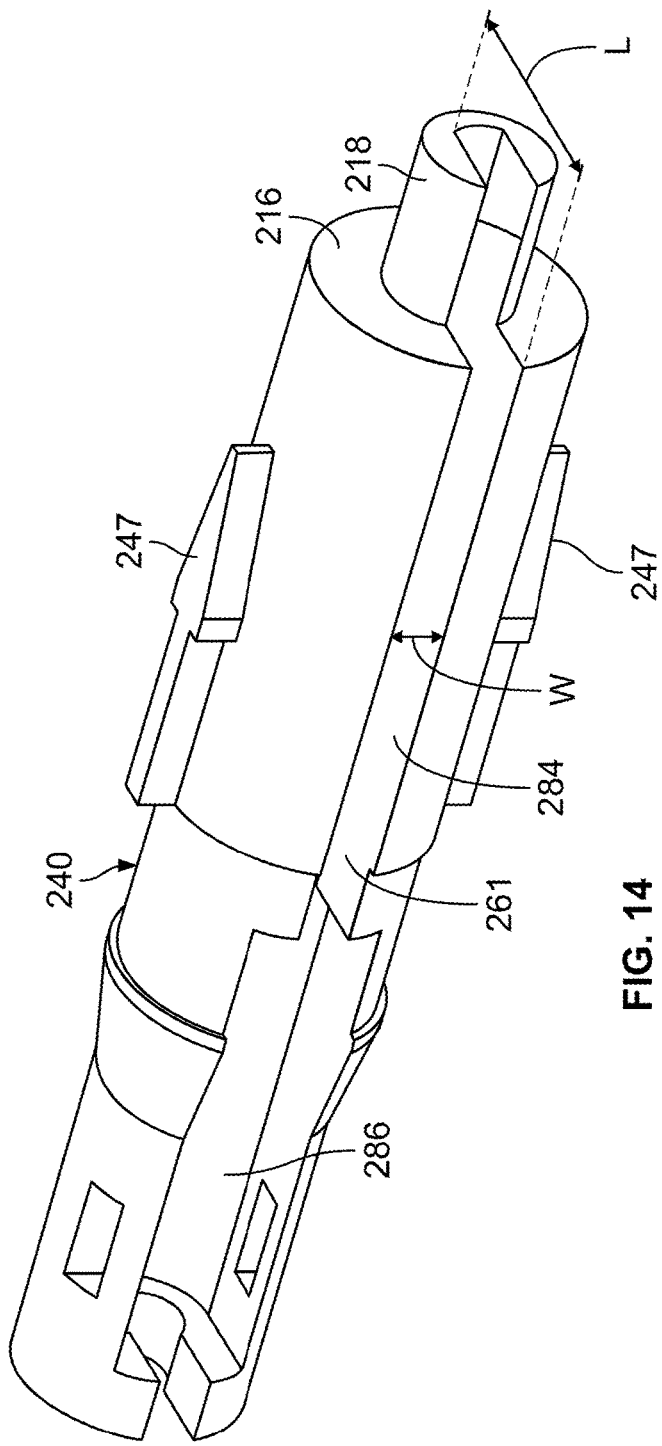
FIG. 14 is a front, side perspective view of a rear housing of the fiber optic connector and cable assembly of FIG. 10.
Figure 15:
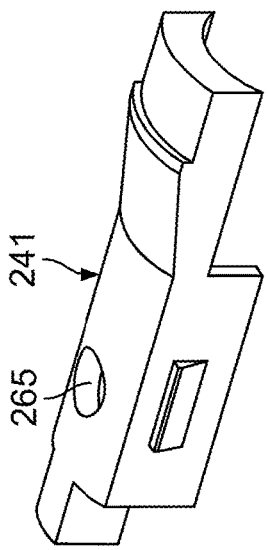
FIG. 15 is a perspective view of an adhesive cap that mates with the rear housing of FIG. 14.
Figure 16:
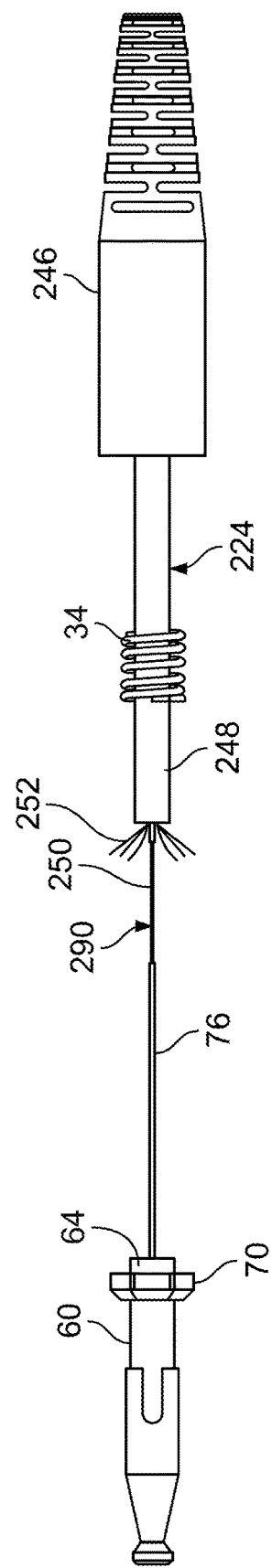
FIG. 16 illustrates a splice location for the fiber optic connector and cable assembly of FIG. 10.

Referring to FIG. 10, the rear housing 240 can be secured to the front housing 230 by a snap-fit connection. For example, the rear housing 240 can fit inside the front housing 230 and can include tabs 247 that snap within corresponding openings 249 of the front housing 230 (see FIGS. 12 and 13).

The boot 246 is preferably more flexible than the rear housing 240 and mounts at a rear end of the rear housing 240. Similar to the previously described boot 46, the boot 246 functions to provide bend radius protection at the cable-to-connector interface. The flexible boot 246 can have a tapered, segmented configuration to enhance flexibility.

In certain examples, the rear housing 240 can function to define both the forward portion 84 (i.e., the fiber buckling region) of the connector body 54 and the rearward portion 86 (i.e., the splice encapsulating and cable anchoring region) of the connector body 54. The forward and rearward portions 284, 286 are defined within an open sided slot 261 that extends through the entire length of the rear housing 240. The adhesive block 238 mounts within the open sided slot 261 to provide an adhesive barrier between the forward and rearward portions 284, 286. The rearward portion 286 is laterally enclosed by the adhesive cap 241 (see FIG. 15) that is secured to the rear housing 240 so as to cover the portion of the open sided slot 261 corresponding to the rearward portion 286. In certain examples, the adhesive cap 241 is pressed within the open sided slot 261. In certain examples, the adhesive cap 263 is secured to the rear housing 240 by a snap-fit connection.

In the depicted example, the rear housing 240 includes a central front nose section 218 that fits within the rear end of the spring 34 and functions as a positive stop that engages the rear end 64 of the ferrule 60 to stop rearward movement of the ferrule at the rearward ferrule position. The rear housing 240 also includes a forwardly facing surface 216 against which a rear end of the spring seats. In certain examples, the central front nose section 218 extends for at least one quarter of the length of the spring 34 when the ferrule assembly 32 is in the forward ferrule position.

The open-sided slot 261 defines a fiber passage in which the rear stub portion 76 of the ferrule optical fiber 74 is received. The fiber passage of the rear housing 240 defines the front and rear portions 284, 286 of the interior of the connector body 254. The adhesive block 238 mounts within the rear housing 240. The open side of the open-sided slot 261 is enclosed by the adhesive cap 241 at the rearward portion of the interior of the connector body 254. The adhesive cap 263 defines an adhesive injection port 265. The open-sided slot 261 has a transverse cross-sectional shape that is elongated in a lateral orientation to accommodate fiber buckling generally along a single plane that aligns with the central longitudinal axis 68 of the ferrule 60. In certain examples, the transverse cross-sectional shape can have a length L that extends in a lateral orientation and a width W perpendicular to the length. In certain examples, the length L can be at least two times as large as the width W. It will be appreciated that the elongated cross-sectional shape is preferably provided along the forward portion 284 of the connector body 254 to encourage fiber buckling along the longer orientation.

In certain examples, the fiber optic connector and cable assembly 320 is assembled by first sliding the boot 246 over the fiber optic cable 224. Next, the jacket 248 of the cable 224 is stripped from the end of the cable 224 to expose strength members and the cable optical fiber 250. The cable optical fiber 250 is then stripped, cleaved and cleaned. Similarly, the rear stub portion 76 of the ferrule optical fiber 74 is stripped, cleaved and cleaned. The spring 34 is then inserted over the rear stub portion 76 and the rear stub portion 76 is spliced to the cable optical fiber 250. Thereafter, the ferrule assembly 32 is loaded into the front housing 230 through the rear end of the front housing 230. Next, the adhesive block 238 is loaded into the open-sided slot 261 of the rear housing 240. Thereafter, the fiber structure formed by the rear stub portion 76 spliced to the cable optical fiber 250 is inserted into the open-sided slot 261 and into the slot 288 defined by the adhesive block 238. The adhesive cap 241 is then snapped into the open-sided slot 261 to enclose the adhesive chamber defined by the rear housing 240. Next, the rear housing 240 is snapped into the front housing 230 such that the ferrule assembly 32 and the spring 34 are captured therein. Curable adhesive is then injected into the adhesive chamber through the adhesive injection port 265 defined by the adhesive cap 241. In this way, the splice location 290 as well as the end of the fiber optic cable 224 are encapsulated by adhesive within the adhesive chamber defined by the rear housing 240. The boot 246 is then inserted over the rear of the rear housing 240.

While various specific dimensions are provided above, it will be appreciated that the dimensions are applicable to some embodiments and that other embodiments within the scope of the present disclosure may use dimensions other than those specifically provided. Similarly, while various manufacturing tolerances are provided above, it will be appreciated that the manufacturing tolerances are applicable to some embodiments and that other embodiments within the scope of the present disclosure may use manufacturing tolerances other than those specifically provided. The above specification, examples and data provide a description of the inventive aspects of the disclosure. Many embodiments of the disclosure can be made without departing from the spirit and scope of the inventive aspects of the disclosure.

What is claimed is:

1. A fiber optic connector and cable assembly comprising:
   a connector body including a front housing interconnected with a rear housing, the front housing including a front end and a rear end, the front end of the front housing forming a plug portion of the connector body, the rear housing extending rearwardly from the rear end of the front housing;
   a ferrule assembly that mounts within the connector body, the ferrule assembly including a ferrule having a front end and a rear end, the front end of the ferrule being accessible at the front end of the front housing, the ferrule defining a central bore that extends through the ferrule along a central longitudinal axis of the ferrule, the ferrule assembly including a ferrule flange mounted on the ferrule, the ferrule flange defining a rearwardly facing surface, the ferrule assembly being movable within the connector body along the central longitudinal axis of the ferrule between a forward ferrule position and a rearward ferrule position, the ferrule assembly including a ferrule optical fiber secured within the central bore of the ferrule, the ferrule optical fiber including a rear stub portion that projects rearwardly from the rear end of the ferrule;
   a spring for biasing the ferrule assembly toward the forward ferrule position, the spring applying a forward biasing force to the rearwardly facing surface of the ferrule flange;
   an adhesive plug mounted within the connector body at a position which divides an interior of the connector body into a forward portion and a rearward portion, the adhesive plug defining a slot through which the rear stub portion of the ferrule optical fiber extends;
   a fiber optic cable including a cable optical fiber fusion spliced to the rear stub portion of the ferrule optical fiber at a splice location within the rearward portion of the interior of the connector body;
   a curable adhesive that fills the rearward portion of the interior of the connector body, the curable adhesive encapsulating the splice location and anchoring the cable within the rearward portion of the interior of the connector body; and
   the adhesive plug being configured to prevent the curable adhesive from entering the forward portion of the interior of the connector body, and the forward portion of the interior of the connector body forming a fiber buckling region for accommodating buckling of the rear stub portion of the ferrule fiber as the ferrule moves from the forward ferrule position toward the rearward ferrule position.

2. The fiber optic connector and cable assembly of claim 1, wherein the fiber buckling region accommodates fiber buckling corresponding to at least 0.04 inches of movement of the ferrule assembly from the forward ferrule position to the rearward ferrule position.

3. The fiber optic connector and cable assembly of claim 1, wherein the fiber buckling region is configured to force the rear stub portion to buckle along a single pre-defined fiber buckling plane that includes the central longitudinal axis of the ferrule.

4. The fiber optic connector and cable assembly of claim 1, wherein strength members of the cable are anchored within the rearward portion of the interior of the connector body via the curable adhesive.

5. The fiber optic connector and cable assembly of claim 1, wherein a cable jacket of the cable is anchored within the rearward portion of the interior of the connector body via the curable adhesive.

6. The fiber optic connector and cable assembly of claim 1, wherein the spring has a forward end that seats against the rearwardly facing surface of the ferrule flange, wherein the rearwardly facing surface of the ferrule flange is forwardly offset with respect to the rear end of the ferrule, and wherein the ferrule flange is located closer to the rear end of the ferrule as compared to the front end of the ferrule.

7. The fiber optic connector and cable assembly of claim 1, wherein the ferrule flange and the front housing have a mating interface that prevents rotation of the ferrule assembly relative to the front housing about the central longitudinal axis of the ferrule.

8. The fiber optic connector and cable assembly of claim 1, wherein the rear housing includes a rear sleeve that mounts over a rear end of the front housing.

9. The fiber optic connector and cable assembly of claim 8, further comprising two cable supports that mount at a rear end of the rear sleeve to enclose the rear end of the rear sleeve, the cable supports cooperating to define a central cable passage having a transverse cross-sectional shape that matches a transverse cross-sectional profile of a jacket of the cable, the cable supports each defining an outer longitudinal adhesive injection port in fluid communication with the rearward portion of the interior of the connector body.

10. The fiber optic connector and cable assembly of claim 9, further comprising a rotatable fastener mounted over the rear sleeve, the rotatable fastener being free to rotate relative to the rear sleeve about the central longitudinal axis, the rotatable fastener being configured to secure the fiber optic connector within a corresponding ruggedized fiber optic adapter.

11. The fiber optic connector and cable assembly of claim 10, further comprising a flexible boot for providing fiber bend radius protection at an interface between the fiber optic connector and the fiber optic cable, the flexible boot being more flexible than the rear sleeve and being secured to the rear end of the rear sleeve at a location rearward of the rotatable fastener, the flexible boot having a tapered outer profile that tapers inwardly as the flexible boot extends in a rearward direction, the flexible boot having a segmented configuration to enhance flexibility.

12. The fiber optic connector and cable assembly of claim 1, further comprising a spring stop that is mounted within the interior of the connector body, the spring stop including a forwardly facing surface against which a rear end of the spring seats, the spring stop also including a central front nose section that fits inside the rear end of the spring, the central front nose section forming a positive stop that engages the rear end of the ferrule to stop rearward movement of the ferrule at the rearward ferrule position, the spring stop having a fixed axial position relative to the front housing.

13. The fiber optic connector and cable assembly of claim 12, wherein the spring stop defines a central passage through which the rear stub portion of the ferrule optical fiber extends, the central passage defining a first cross-dimension at the central front nose section and a second cross-dimension at a main section of the spring stop, the main section being positioned rearwardly with respect to the central front nose section, the second cross-dimension being larger than the first cross-dimension, the spring stop further including a transition section that provides a tapered internal transition between the first cross-dimension and the second cross-dimension.

14. The fiber optic connector and cable assembly of claim 13, wherein the fiber buckling region is positioned within the spring stop, wherein the adhesive plug is mounted at the rear end of the front housing, and wherein the spring stop includes a rear end positioned adjacent the adhesive plug.

15. The fiber optic connector and cable assembly of claim 14, wherein the spring stop defines elongated side through-slots elongated along the central longitudinal axis of the ferrule, the elongated side through-slots being positioned on opposite sides of the central longitudinal axis, the elongated side through-slots being positioned at the main section of the spring stop and being configured to allow the rear stub portion of the ferrule optical fiber to flex through one of the elongated side through-slots during buckling of the rear stub portion of the ferrule optical fiber.

16. The fiber optic connector and cable assembly of claim 1, wherein the rear housing includes a forwardly facing surface against which a rear end of the spring seats.

17. The fiber optic connector and cable assembly of claim 16, wherein the rear housing includes a central front nose section that fits within the rear end of the spring and functions as a positive stop that engages the rear end of the ferrule to stop rearward movement of the ferrule at the rearward ferrule position.

18. The fiber optic connector and cable assembly of claim 17, wherein the rear housing includes a fiber passage in which the rear stub portion of the ferrule optical fiber is received, wherein the fiber passage of the rear housing defines the front and rear portions of the interior of the connector body, wherein the adhesive plug mounts within the rear housing.

19. The fiber optic connector and cable assembly of claim 18, wherein the fiber passage is defined by an open-sided slot, wherein an open side of the open-sided slot is enclosed by an adhesive cap at the rearward portion of the interior of the connector body, and wherein the adhesive cap defines an adhesive injection port.

20. The fiber optic connector and cable assembly of claim 19, wherein the open-sided slot has a transverse cross-sectional shape that is elongated in a lateral orientation to accommodate fiber buckling, the transverse cross-sectional shape having a length that extends in the lateral orientation and a width perpendicular to the length, the length being at least two times as large as the width.

* * * * *